United States Patent Office 3,079,359
Patented Feb. 26, 1963

3,079,359
ADJUSTMENT OF THE RHEOLOGICAL PROPERTIES OF A DISPERSION OF RUBBER IN AN ORGANIC SOLUTION OF RUBBER BY ADDING WATER
Robert F. Stierli, Lexington, Mass., assignor to W. R. Grace & Co., Cambridge, Mass., a corporation of Connecticut
No Drawing. Filed Aug. 2, 1961, Ser. No. 128,649
6 Claims. (Cl. 260—29.7)

This invention relates to dispersions of natural and synthetic rubber in organic liquids. More particularly, it relates to a method for reducing the stringing or "pig-tailing" of such a dispersion when it is applied to a surface by passing the dispersion through a nozzle.

My invention is concerned with the type of rubber dispersions described in U.S. Patent 2,593,681 to Arthur J. Leydon. According to this patent, two rubbers having different solubility characteristics are intermilled, and the resulting rubbery mass is then agitated in the presence of an organic liquid which is a solvent for one of the rubbers and a non-solvent for the other. The finished composition, a dispersion of microscopic particles of the insoluble rubber in a solution of the soluble rubber, is characterized by both low viscosity and high total solids. In addition, films deposited from such a dispersion have been found to have the advantageous properties of resistance to water and steam, and greatly reduced tendency to oxidation and depolymerization.

The word "rubber" as used in U.S. Patent 2,593,681 and in the present specification and claims, means a rubbery polymeric material, for example natural rubber, polymers, interpolymers, and copolymers of conjugated diolefins, i.e., polybutadiene, butadiene-styrene copolymers, butadiene-acrylonitrile copolymers, polymers and copolymers of methylpentadiene; polymeric forms of chlorine substitution products of conjugated diolefins, i.e., polychloroprene; polymers of non-conjugated systems, i.e., polyisobutylene and copolymers of isobutylene and isoprene; and condensation polymers of the polysulphide type. All of said polymeric compounds are rubbery and elastic at room temperature even when unplasticized.

Rubbers derived from different chemical sources usually behave very differently in a given solvent. For example, natural rubber is soluble in octane; polychloroprene is not. In addition, rubber from the same chemical sources, but having different ratios of the monomers in the resulting copolymer, may be soluble or insoluble in the selected solvent, depending upon monomeric ratio. For example, butadiene-styrene and butadiene-acrylonitrile copolymers of high monomeric ratios of butadiene to styrene and butadiene to acrylonitrile are affected by solvent in materially different degrees from copolymers wherein the monomeric ratio is low. Such rubbers are described in U.S. Patent 2,593,681 as "having different solubility characteristics."

In general, any suitable rubbers can be used either as the dissolved or the suspended material provided the two rubbers have different solubility characteristics and a proper liquid medium is chosen, the choice of the suspended rubber depending on the particular qualities required of the film, and the use to which it is to be put.

Suitable liquids are—among others—hexane, octane, methylethyl ketone, acetone and toluol. Benzol and chlorinated solvents may be used where toxic effects are not objectionable. The essential feature of the liquid is that it shall form a solution of one rubber and shall not dissolve, although it may swell, the other rubber. Combinations of liquids which together form a solvent may be employed. It is possible to employ liquids having high rates of evaporation, thus cutting down the drying time and reducing the expense of the drying equipment.

The selection of the particular rubbers and liquid medium for the solution-dispersion compositions with which this invention is concerned forms no part of the present invention.

The wide variety of combinations of rubbers and solvents which may be used to produce rubber dispersions of the above-described type is illustrated in Table I, which lists the materials used in the examples of U.S. Patent

TABLE I

| Example | Dispersed Rubber | | Dissolved Rubber | | Solvent | | Centipoises Viscosity | Total Solids (Percent) |
|---|---|---|---|---|---|---|---|---|
| | Type Rubber | No. of Parts | Type Rubber | No. of Parts | Type Solvent | No. of Parts | | |
| 1 | Polychloroprene (Neoprene GN). | 500 | Natural rubber | 125 | Octane | 900 | 4,400 | 43.3 |
| 2 | ----do---- | 500 | Butadiene-styrene (SBR 1004). | 125 | Hexane / Toluene | 900 / 100 | 9,100 | 44.0 |
| 3 | Natural rubber | 500 | Butadiene-acrylonitrile ("Hycar" 1001). | 125 | Acetone | 880 | 9,600 | 45.7 |
| 4 | Isobutylene-isoprene (IIR). | 500 | Butadiene-acrylonitrile ("Chemigum" N-600). | 125 | ----do---- | 1,300 | 3,400 | 43.5 |
| 5 | Butadiene-acrylonitrile ("Chemigum" N-600). | 500 | Isobutylene-isoprene (IIR). | 125 | Octane | 1,200 | 7,000 | 42.5 |
| 6 | ----do---- | 500 | Butadiene-styrene (SBR 1004). | 125 | Hexane / Methylethyl-ketone | 1,100 / 200 | 4,400 | 33.0 |
| 7 | ----do---- | 500 | Isobutylene (80,000 M.W.). | 125 | Octane | 1,500 | 11,600 | 35.1 |
| 8 | Polysulphide condensation polymer ("Thiokol" FA). | 400 | Butadiene-acrylonitrile ("Chemigum" N-600). | 100 | Acetone | 2,000 | 6,000 | 35.1 |
| 9 | Butadiene-acrylonitrile ("Chemigum" N-600). | 500 | Butadiene-styrene (SBR 1004). | 125 | Octane | 1,200 | 2,360 | 38.0 |
| 10 | Polychloroprene (Neoprene GN). | 500 | Butadiene-styrene (SBR 1004). / Isobutylene-isoprene (IIR). | 50 / 50 | ----do---- | 1,550 | 1,240 | 33.9 |
| 11 | Butadiene-acrylonitrile ("Chemigum" N-600). | 500 | Butadiene-styrene (SBR 1004). / Isobutylene-isoprene (IIR). | 50 / 100 | ----do---- | 1,600 | 3,530 | 32.7 |
| 12 | Polychloroprene (Neoprene GN). | 500 | Butadiene-styrene (SBR 1004). | 75 | ----do---- | 875 | 1,400 | 40.3 |
| 13 | ----do---- | 500 | ----do---- | 50 | ----do---- | 850 | 4,400 | 45.9 |

2,593,681. Although the rubbers are identified in Table I by the name or designation in current use, in each case the rubber is the same as or has the same solubility characteristics as that used in the corresponding examples of U.S. Patent 2,593,681.

Dispersions made according to the above patent have proved to be particularly useful as sealing compounds for sanitary cans, being characterized by both their ease of application and the desirable properties of the dried films. They have, however, had one practical disadvantage, as explained below.

A sealing compound is applied to can ends by passing the compound through the nozzle of a can end lining machine according to techniques which are well known in the art. Generally speaking, the nozzle of a lining machine opens when a new can end is placed in proper position beneath the nozzle, delivers the proper quantity of sealing compound to the can end and then closes to complete the cycle. It is highly desirable that the sealing compound be of such a nature that no compound is left on the tip of the nozzle after the nozzle has been closed. Excess compound on the nozzle tip, and particularly strings of compound depending from the nozzle, cause soiling of the can ends, the machine and the surroundings, and in general interfere with the smooth, trouble-free operation of the lining machine.

Sealing compounds based on dispersions of rubber made according to the process of U.S. Patent 2,593,681, while they have been widely and successfully used, have a serious tendency to form strings on the nozzle of the lining machine. This stringing tendency has usually been accommodated by special design of the can end lining machine and/or by control of the process, such that satisfactory performance could be achieved. Modification of the compounds themselves to overcome this stringing tendency has not heretofore been completely successful.

It is an object of my invention to produce a can sealing compound based on a dispersion of rubber in a rubber solution as described above, which will have a reduced tendency to stringing when applied to can ends by passing through the nozzle of a lining machine. Another object of my invention is to produce such a can sealing compound in which the reduced tendency to stringing will be achieved without impairing the quality of the dried film or reducing the sealing efficiency of the compound.

I have discovered that the desired advantages of reduced stringing and unimpaired sealing efficiency may be obtained by adding small amounts of water together with an appropriate surface-active agent to a can sealing compound which is based on a dispersion of an insoluble rubber in a solution of a soluble rubber as described in the above-mentioned Leydon patent. Any of the dispersions made according to the Leydon patent may be improved in this manner, as shown in the following examples.

*Example I*

A 500 gram portion of polychloroprene rubber (neoprene GN) and a 125 gram portion of butadiene-styrene rubber (SBR 1004) were milled together for 15 to 20 minutes on a conventional rubber mill with tightly set, chilled rolls. After milling, the stock was transferred to a Werner-Pfleiderer type of mixer equipped with a sigma blade, and solvent was run into the working mass in small increments, with sufficient time allowed between additions so that each addition of solvent was completely taken up by the rubber. The solvent used consisted of a mixture of 900 grams of hexane and 100 grams of toluene, in which a solution of 8 grams of the dioctyl ester of sodium sulfosuccinic acid in 100 grams of water had been emulsified. Working in the Werner-Pfleiderer mixer was continued until the more soluble butadiene-styrene rubber was dissolved, and the polychloroprene rubber, insoluble in the particular mixture of solvents used, was disrupted and dispersed in the solution of butadiene-styrene rubber. A smooth, creamy, fine-grained dispersion resulted.

The dispersion of polychloroprene rubber in a solution of butadiene-styrene rubber, when applied to can ends by passing through the nozzle of a can end lining machine, left no strings on the tip of the nozzle. The addition of water and emulsifying agent to the dispersion in no way impaired the quality of the dried films which were laid down from the dispersion.

The dispersion of Example I was identical with that of Example 2 of the Leydon patent, as shown in Table I above, except for the addition of the small amount of water and surface-active agent. The addition of water and surface-active agent produced a completely non-stringing compound when the compound was tested by being passed through the nozzle of a can-end lining machine.

*Example II*

A dispersion was prepared by the method of Example I using 500 grams of butadiene-acrylonitrile rubber ("Chemigum" N–600), 125 grams of butadiene-styrene rubber (SBR 1004) and a mixture of 1,100 grams of hexane and 200 grams of methyl ethyl ketone. After dispersion was complete, a solution of 6.5 grams of the iso-octyl phenyl ether of polyethylene glycol in 130 grams of water was stirred into the composition until a stable dispersion of fine droplets of water in the rubber dispersion was achieved.

The rubber dispersion containing water and surface-active agent, when passed through the nozzle of a can end lining machine, left no strings on the tip of the nozzle. The presence of water and emulsifying agent in the compound in no way impaired the quality of dried films laid down from the dispersion.

The dispersion of Example II was identical with that shown in Table I as Example 6 of the Leydon patent above referred to, with the exception of the water and surface-active agent which was added after the dispersion of the rubber had been completed.

*Example III*

The method of Example II was followed, using 500 grams of isobutylene-isoprene rubber (IIR), 125 grams of butadiene-acrylonitrile rubber ("Chemigum" N–600) and 1300 grams of acetone. After dispersion of the isobutylene-isoprene rubber in the acetone solution of butadiene-acrylonitrile rubber was complete, a solution of 11 grams of the dioctyl ester of sodium sulfosuccinic acid in 200 grams of water was stirred into the composition until a stable dispersion of fine droplets of water in the rubber dispersion was achieved.

The rubber dispersion which was identical with that of Example IV of the Leydon patent except for the presence of the water and surface-active agent, when passed through the nozzle of a can-end lining machine, left no strings on the tip of the nozzle and produced a dried film of excellent quality.

*Example IV*

The rubbers used in this example are identical with those used in Example III, except that their roles in the dispersion are reversed. The dispersion corresponds to that of Example V of the Leydon patent.

A 500 gram portion of butadiene-acrylonitrile rubber ("Chemigum" N–600) was milled with a 125 gram portion of isobutylene-isoprene rubber (IIR) and a 1200 gram portion of octane was added, following the procedure of Example III. The resulting dispersion contained the butadiene-acrylinitrile rubber as the disperse phase, and an octane solution of isobutylene-isoprene rubber as the continuous phase.

After dispersion was complete, a solution of 11 grams of the dioctyl ester of sodium sulfosuccinic acid in 180 grams of water was stirred into the composition until a stable dispersion of fine droplets of water in the rubber dispersion was achieved. The resultant dispersion was found to leave no strings on the nozzle tip when passed through a can-end lining machine, and produced a dried film of excellent quality.

Other ingredients such as fillers, waxes, plasticizers, resins, pigments, etc. may be added to the basic dispersions of the examples in order to impart desired characteristics either to the dispersion or to its dried films.

I have found that from about ½% to about 2% of wetting or emulsifying agent based on the total solids of the compound is a suitable amount for proper incorporation of the water into the sealing compound, and that about 1.25% gives the most desirable results. I prefer not to use more than about 2% of wetting or emulsifying agent, since larger amounts tend to increase the water susceptibility of a dried film deposited from the compound.

The amount of water used in making the non-stringing compounds of my invention may be as little as 5% of the weight of the solvent used. Below this proportion, the effect on the compound is too small to be of any practical consequence. Increasing the amount of water tends to give increased improvement in the properties of the compound. As a practical matter, however, the amount which may be added is limited to about 20%, since larger amounts of water interfere with the rapid drying of the compound and necessitate the use of drying ovens. The optimum amount of water has been found to be about 10% based on the weight of the solvent used.

The water and emulsifying agent may be added to the solvent before the dispersion is formed, as shown in Example I, or they may be added to the finished compound, as shown in Example II.

The can sealing compounds of my invention have another and rather unexpected advantage in addition to their lowered stringing tendency. Ordinarily, the emulsification of droplets of water in an organic solvent or in a solvent solution of rubber increases the viscosity of the solvent or solvent solution. When water is emulsified in can sealing compounds based on dispersions of rubber in rubber solutions according to the teachings of my invention, however, the reverse has proved to be true. The emulsification of small amounts of water in such compounds actually reduces the viscosity of the compounds by an appreciable amount.

Reduction of the viscosity of materials which are to be applied by passage through a nozzle has an important advantage. For one thing, it is possible to obtain a lower viscosity with the same basic composition; alternatively a compound of higher total solids, and consequently higher viscosity, may be made and the viscosity then lowered to a workable level by the addition of small amounts of water. I have found that by using my invention, the percentage of total solids in my inproved compounds may be increased as much as 1% over that of conventional compounds without any increase in the viscosity of the compounds. This increase is large enough to represent an important gain in the constant effort to increase the total solids content of can sealing compounds while maintaining workable viscosities.

My improved compositions, therefore, are characterized by reduced tendency toward stringing when applied through a nozzle, by unchanged properties of their dried film, and by unimpaired sealing efficiency. In addition, my invention permits the formulation of compounds of higher total solids without exceeding the viscosity desired for can sealing compounds.

This application is a continuation-in-part of my copending application Serial No. 776,414, filed November 26, 1958, now abandoned.

I claim:
1. In a freely flowable rubber composition of two rubbery elastic millable polymers having different solubility characteristics in the same solvent, and a volatile organic liquid which is a solvent for one of said polymers and a non-solvent for the other thereof, one of said polymers being dissolved in the solvent forming a solution and the other being dispersed as fine, undissolved particles in the solution; the improvement thereof consisting of from 5% to 20% by weight of water based on the weight of said organic liquid present in the said rubber composition, the water being in the form of a stable dispersion of fine droplets of water which are suspended in the freely flowable rubber composition by means of an emulsifying agent selected from the group consisting of the dioctyl ester of sodium sulfosuccinic acid and the isoctyl phenyl ether of polyethylene glycol, said emulsifying agent being present in said rubber composition in the proportion of about ½% to about 2% by weight of the total solids therein.

2. The composition of claim 1 in which the water is present in the proportion of about 10% by weight of said volatile organic liquid.

3. The composition of claim 1 in which the surface-active agent is present in the proportion of about 1.25% by weight of the total solids therein.

4. In a method of making a freely flowable rubber composition of two rubbery elastic millable polymers having different solubility characteristics in the same solvent and a volatile organic liquid which is a solvent for one of said polymers and a non-solvent for the other thereof, one of said polymers being dissolved in the solvent forming a solution and the other being dispersed as fine, undissolved particles in the solution, which comprises intermilling said rubbery polymers, subjecting the milled mass to mechanical treatment in the presence of said organic liquid until the insoluble rubber is disrupted and dispersed in the form of discrete particles suspended in the solution of the soluble rubber; the improvement comprising forming a stable dispersion of small droplets of water in the said flowable rubber composition, said water being present in a proportion of from 5% to 20% by weight of said volatile organic liquid, the droplets of water being held suspended in said rubber composition by means of an emulsifying agent selected from the group consisting of the dioctyl ester of sodium sulfosuccinic acid and the iso-octyl phenyl ether of polyethylene glycol, said emulsifying agent being present in the proportion of from about ½% to about 2% by weight of the total solids of said rubber composition.

5. The method of claim 4 wherein said water and said emulsifying agent are added to said volatile organic liquid prior to the incorporation of said volatile organic liquid into rubber composition.

6. The method of claim 4 wherein said water and said emulsifying agent are added to said rubber composition after the addition of said volatile organic liquid.

References Cited in the file of this patent

UNITED STATES PATENTS

| | | |
|---|---|---|
| 2,238,956 | Strother | Apr. 22, 1941 |
| 2,593,681 | Leydon | Apr. 22, 1952 |
| 2,613,156 | McGaffin | Oct. 7, 1952 |
| 2,624,718 | Bezman et al. | Jan. 7, 1953 |
| 2,767,152 | Bierman | Oct. 16, 1956 |
| 2,880,184 | Groves | Mar. 31, 1959 |